March 14, 1950     LA VERN H. BECKBERGER     2,500,235
PYROLYTIC CONVERSION OF HYDROCARBONS
Filed June 17, 1947
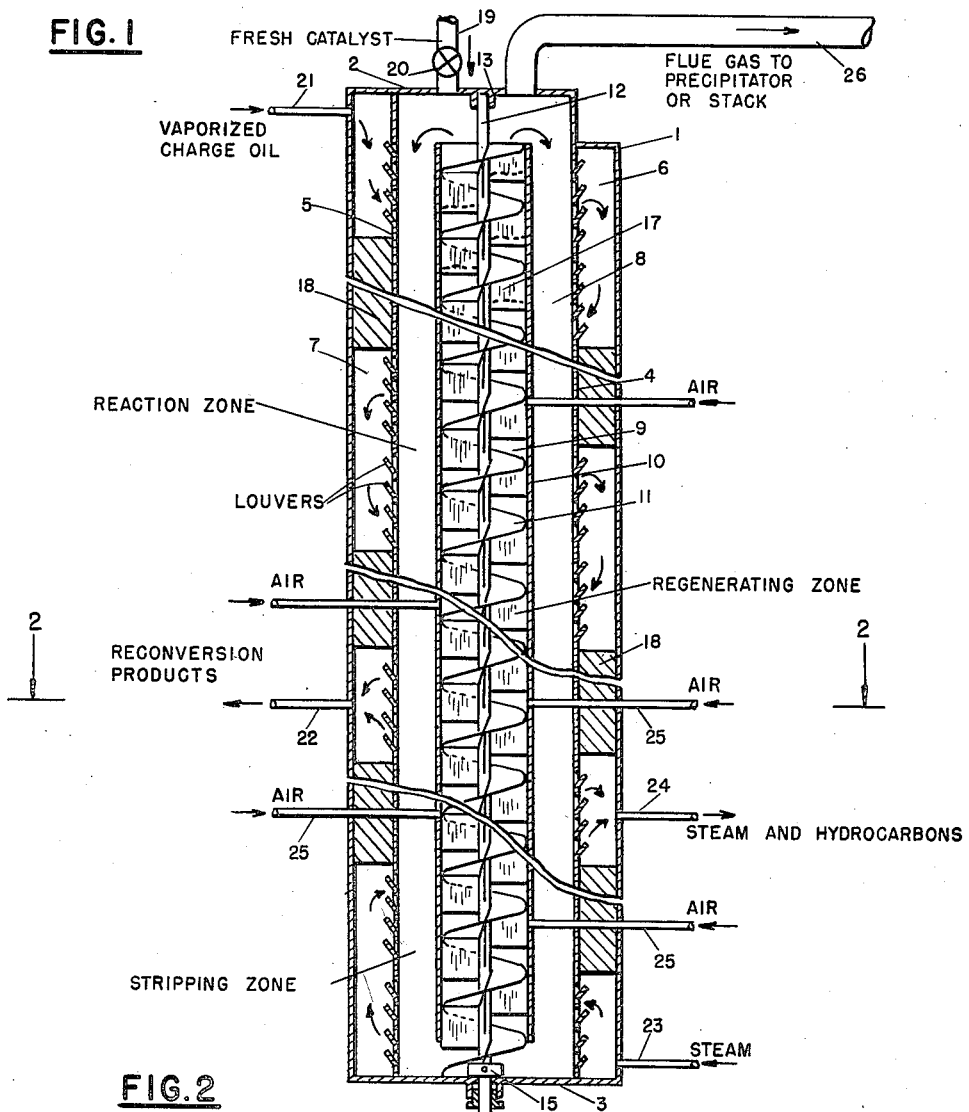
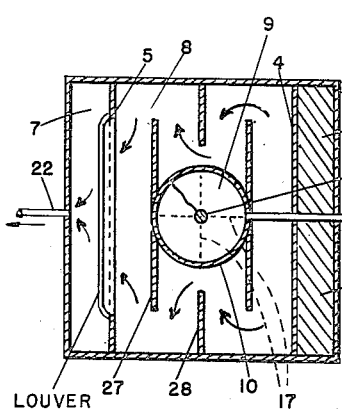
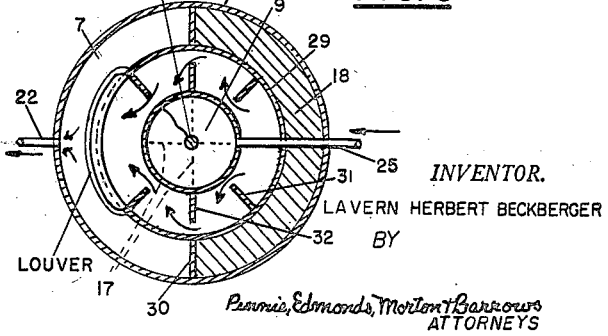
INVENTOR.
LAVERN HERBERT BECKBERGER
BY
Pennie, Edmonds, Morton & Barrows
ATTORNEYS Patented Mar. 14, 1950

2,500,235

UNITED STATES PATENT OFFICE 2,500,235

PYROLYTIC CONVERSION OF HYDROCARBONS

La Vern Herbert Beckberger, East Chicago, Ind., assignor to Sinclair Refining Company, New York, N. Y., a corporation of Maine Application June 17, 1947, Serial No. 755,200

4 Claims. (Cl. 23—288)

This invention relates to the pyrolytic conversion of hydrocarbons and provides an improved apparatus especially adapted to the carrying out of such pyrolytic conversion processes involving the use of a solid catalyst.

In such operations, a carbonaceous deposit is formed on the solid catalyst during the hydrocarbon conversion and the catalyst must be periodically regenerated to restore its catalytic effectiveness.

In one method of operation previously proposed, the hydrocarbons to be converted are passed continuously upwardly through a downwardly gravitating bed of catalyst in granular or pelleted form in a vertically elongated conversion chamber of large transverse dimensions, the catalyst being continuously withdrawn from the lower end of the chamber, regenerated, and returned to the upper end of the chamber. The regeneration is effected by burning off the carbonaceous deposit by passing the hot catalyst downwardly through a similar vertically elongated chamber countercurrent to a stream of air.

Such operations have entailed expensive and troublesome mechanical elevator means for conveying the catalyst from the lower end of the conversion chamber to the top of the regenerating chamber and again from the lower end of the regenerating chamber to the top of the conversion chamber. Difficulties have also been experienced in effecting uniform contact between the hydrocarbon vapors and the catalyst by reason of the tendency of the vapors to channel upwardly through the bed of catalyst. Similar difficulties have been experienced in the regeneration of the catalyst. The present invention provides an improved apparatus whereby these difficulties are avoided.

The apparatus of my present invention is especially adapted to the carrying out of a process described and claimed in my copending application Ser. No. 755,199 filed concurrently herewith according to which the catalyst at an elevated temperature is caused to gravitate as a continuous, vertically elongated bed or column downwardly through a vertically elongated chamber of comparatively small transverse dimensions. The hydrocarbon vapors to be converted are repeatedly passed back and forth through the downwardly gravitating, vertically elongated bed of hot catalyst at progressively different elevations whereby conversion of the hydrocarbons is effected with resultant deposition of carbonaceous material on the catalyst.

The spent catalyst is passed from the lower end of the reaction zone into the lower end of a second vertically elongated chamber, advantageously of equal or greater height than the reaction chamber and, with advantage, in heat exchange relation with the reaction zone. The catalyst is passed upwardly through the second chamber by suitable means, for instance, a helical screw conveyor or flue gas lift and controlled quantities of air are introduced into the second chamber at a plurality of vertically spaced positions, whereby the carbonaceous deposit is progressively burned off from the catalyst.

The amount of air passed to the lower portion of the regenerating zone in contact with the catalyst higher in carbonaceous material is, with advantage, so restricted as to retard combustion to an extent sufficient to avoid excessive temperature rise. At progressively higher zones, additional fresh air is brought into contact with the partially regenerated catalyst in amounts sufficient to burn off residual carbonaceous material.

As previously noted, the regenerating zone is, with advantage, in heat exchange relationship with the reaction zone and a portion of the regeneration heat is transmitted to the reaction zone. This is particularly desirable in operations involving endothermic reactions and effectively reduces the temperature gradient between the upper and lower portions of the reaction zone.

Where the regenerating zone is not in heat exchange relationship with the reaction zone, conventional means for cooling the walls of the regenerating zone may be provided. The temperature of the catalyst passing from the regenerating zone to the reaction zone may further be controlled by the introduction of cool excess air into the upper portion of the regenerating chamber. Also conventional means for extracting heat from the regenerating chamber may be employed.

Heat for effecting the conversion is supplied in large measure, at least, by the burning of the carbonaceous deposit. Additional heat may be supplied where required by preheating the hydrocarbon vapors or the regenerating air, or both.

Hydrocarbon vapors to be converted may be passed through the catalyst bed at progressively higher, or progressively lower levels, that is, in a generally counter-current or generally concurrent direction with respect to the direction of the catalyst flow.

Due precautions should be taken to minimize intermixing of hydrocarbon vapors and the gaseous products of the regeneration. Further, it is desirable to strip the spent catalyst of vaporizable hydrocarbons prior to passing the spent catalyst to the regenerating zone. This is, with advantage, accomplished by passing a gaseous stripping medium through the catalyst in the lower portion of the vertically elongated regenerating chamber.

In a particularly advantageous method of operation, in accordance with my invention, the hydrocarbon vapors are repeatedly passed through the column of catalyst, at progressively lower levels in the reaction chamber, and steam or other gaseous inert stripping medium is passed through the catalyst in the lower zone of the reaction chamber at progressively higher livels. The stripping medium and stripped hydrocarbons may be withdrawn from a zone lower than that from which the conversion products are withdrawn, or they may be intermixed and withdrawn from a common zone.

Catalyst fines are frequently formed by attrition of the catalyst during repeated circulation through the system, and it is usually necessary to remove these fines to avoid their excessive accumulation. In accordance with my present invention, the catalyst fines are carried off from the system in suspension in the gaseous products of combustion from the regenerating zone.

By proper control of the rate of downward flow of the catalyst bed and coordinating therewith the rate of flow and number of passes of the hydrocarbon vapors therethrough, the catalyst will be substantially spent and ready for regeneration by the time it reaches the lower end of the reaction zone. Further, by proper control of the rate at which the catalyst is carried upwardly through the regenerating zone and the amount of air passed thereto, the catalyst will be completely regenerated and ready for reuse in the conversion operation by the time it reaches the upper end of the regenerating zone.

The optimum rate of downward flow of the catalyst bed will depend primarily upon the type of catalyst employed, the type of hydrocarbon being converted, operating temperatures, the rate of hydrocarbon feed, the extent of the required reaction, the depth of cracking, for instance, the number of passes through the catalyst and the thickness of the catalyst bed. The optimum rate of catalyst flow for any particular operation is readily determinable by simple test and is controlled by the rate of the passage of the catalyst from the reaction zone to the regenerating zone which, in turn, is controlled by the rate of the upward passage of the catalyst through the regenerating zone, for instance, by the rate of operation of the conveyor.

The apparatus is adapted to various types of hydrocarbon conversion and to the use of various solid catalyst in granular or pelleted form. The invention will be more particularly described and illustrated with reference to the accompanying drawing, of which —

Figure 1 represents a vertical section of a particularly advantageous type of apparatus;

Figure 2 is a cross sectional view of the apparatus along the lines 2—2 of Figure 1; and Figure 3 is a cross sectional view of a modified form of apparatus having a cylindrical section.

The apparatus is housed in a casing 1, advantageously of sheet metal and enclosed at its upper and lower ends, respectively, by cover plate 2 and a bottom plate 3. The casing may be either rectangular, as shown in Figure 2, or cylindrical, as shown in Figure 3.

Referring more particularly to the modification represented by the Figures 1 and 2, the interior of the apparatus is divided into three sections by partitions 4 and 5, vertically positioned within the casing 1, section 6 lying between partition 4 and the right hand end wall of the casing, section 7 lying between partition 5 and the left hand end wall of the casing and section 8 lying between partitions 4 and 5.

Coaxially positioned within section 8 is the vertical elongated chamber 9 formed by cylindrical casing 10. Coaxially positioned within the casing 10 is a helical screw conveyor 11 supported and driven by shaft 12 which, in turn, is supported at its upper end by a bearing 13 and at its lower end by bearing 15 and adapted to be driven by any convenient source of power, not shown in the drawing, through pulley 16. Attached to the lower side of the flights of the helix and spaced 90° apart are downwardly extending fins 17. The lower end of these fins are spaced a substantial distance above the upper surface of the next lower flight, but are of sufficient depth to dip well into the body of catalyst on the flights and to prevent the spiraling of gaseous medium upwardly along the lower surfaces of the flights without substantial contact with the catalyst.

Each of the sections 6 and 7 is completely obstructed by a plurality of vertically spaced partitions 18 dividing the sections into a plurality of vertically spaced chambers, each of which communicates with zones 8 through louvers, the slats of which project upwardly and outwardly into the respective chambers.

The partitions 18 are, with advantage, positioned somewhat as shown in the drawing so as to form separate chambers in the zones 6 and 7 in staggered positions such that the lower end of a given chamber is directly opposite the upper end of the next lower chamber in the opposite end section. These partitions 18 are, for clarity, shown in the drawing as solid sections, but it will be understood that they may be either solid or hollow. Further, for reduction in weight and material used in fabrication, the casing 1 may be discontinuous at the points of the respective partitions 18.

The cylindrical casing 10 terminates short of the upper end of section 8 and likewise terminates at its lower end short of the bottom of section 8. It is supported by suitable brackets, or the like not shown in the drawing.

In charging for operation, the zone 8 is filled with granular catalyst, for instance, introduced through conduit 19 and, during operation, fresh catalyst is introduced from time to time as required through conduit 19, or continuously at a rate controlled by valve 20. Vaporized hydrocarbon oil to be processed is charged through line 21 into the uppermost chamber of section 7 and, from thence, by way of the louvers flows through the body of catalyst in section 8 and into the uppermost chamber of section 6. From the lower portion of said chamber of section 6, the vapors pass back from the body of catalyst into the next lower chamber of section 7 and so back and forth through the body of catalyst at progressively lower elevations, until the vapors reach a lower chamber of section 7 from which they are withdrawn through line 22, to a fractionating apparatus not shown.

The catalyst which has been substantially spent continues downwardly through section 8 and is stripped of readily vaporizable hydrocarbons remaining thereon by steam, or other gaseous stripping medium introduced into the lowermost chamber of section 6 through line 23. From thence, the steam passes by way of the louvers through the catalyst bed in the lowermost portion of section 8 into the lowermost chamber of section 7 and, from thence, back through the body of catalyst into the next higher chamber of section 6 from which the stripping medium and stripped hydrocarbons are withdrawn through line 24.

The stripped catalyst is picked up from the bottom of section 8 by the helical screw conveyor and is carried upwardly thereby through chamber 9 from the upper end of which the catalyst passes by gravity onto the upper end of the body of catalyst in section 8. In operation, section 8 is kept substantially filled with catalyst.

Air is introduced in controlled amounts, as previously described, into chamber 9 at vertically spaced positions through lines 25. Contact of the air with the hot catalyst results in the combustion of the carbonaceous deposit on the catalyst and the products of combustion pass upwardly through the chamber 9 into the upper end of the section 3 from which they pass through conduit 26 to a precipitator, or stack, not shown. Spiraling of the air upwardly along the lower side of the flights is, as previously noted, prevented by the downwardly projecting fins 17.

The horizontal path of the hydrocarbon vapors, and of the stripping medium, through zone 8, from zone 7 to zone 6, is lengthened and uniformity of contact thereof with the catalyst is increased, with advantage, by means of baffles 27 and 28 shown in Figure 2 of the drawings.

In Figure 3 of the drawings, the casing 1 is cylindrical and the zones 6 and 7 are formed by a second coaxially positioned cylindrical casing 29 and partitions 30, extending vertically between casings 1 and 29. In this arrangement, uniformity of contact between the hydrocarbon vapors and the catalyst is promoted and the length of the path of the vapors through the catalyst is increased by means of vertically extending baffles 31 and 32.

The apparatus is shown in Figure 1 of the drawing as partly broken away to indicate greater depth of the spacers 18. Usually these partitions or spacers should be of a depth at least equal to, or somewhat greater than, the length of the path of the vapors through the catalyst bed, so as to minimize any tendency of the gases or vapors to pass directly from one chamber to a chamber immediately above, or below rather than through the catalyst bed to the opposite chamber. Some by-passing of the vapors from one zone to the next higher or lower zone frequently does not seriously interfere with the operation. However, in order to obtain the full benefit of my present process such by-passing of the vapors should be minimized and this may usually be accomplished by increasing the depth of the spacers.

The apparatus shown in the drawing provides for four passes of the hydrocarbon vapors and for two passes of the stripping medium through the catalyst bed. Frequently a greater number of passes of the hydrocarbon vapors is desirable and is within the contemplation of my invention.

The amount of air and the rate at which it is injected into the regenerating zone at the various elevations will depend primarily upon the amount of carbonaceous material deposited on the catalyst and will vary with other operating conditions. The rate of flow of the hydrocarbon vapors through the catalyst is also subject to considerable variation and will depend upon the number of passes, the type of catalyst, the type of conversion desired, the depth of cracking, for instance, operating temperatures and the like.

The apparatus is adapted to the use of various types of catalyst, for instance, natural or synthetic earths, silica gels, and the like, or various inert carriers having active catalyst deposited thereon. The size of the particles of catalyst is, with advantage, of a mesh within the range of 25 to 40, though catalysts of larger and smaller particle size may be employed. Pelleted catalyst as coarse as 4 to 10 mesh may be employed. Usually powdered catalyst, such as used in the fluid catalyst process, is less desirable because of a tendency of the catalyst particles to be carried out of the catalyst bed along with the vapors and stripping medium, but may be used in conjunction with relatively low vapor velocities through the catalyst bed.

Operating conditions are generally subject to considerable variation, depending upon the particular catalyst employed and the nature and extent of the desired reaction. In cracking gas oil, for instance, using a silica-alumina type catalyst, the temperature in the reaction zone is, with advantage, maintained within the range of about 750° to 950° F. and the pressure within the range of about 10 to 15 pounds per square inch. In the regenerating zone, a temperature within the range of 900 to 1,150° F. is usually satisfactory.

The temperature in the reaction zone is dependent in large measure at least upon the temperature of the catalyst passing to the reaction zone from the regenerating zone and may be controlled, as previously described herein. Where the regenerating zone is in heat exchange relationship with the reaction zone, the temperature in the reaction zone will also be influenced by the temperature in the regenerating zone.

By the use of the apparatus of my present invention, the extent of contact between the catalyst and the hydrocarbon vapors being converted, and also the catalytic activity of the catalyst with which the hydrocarbon vapors are brought into contact, may be maintained extremely uniform. Also, the temperature gradient in the reaction zone may be substantially reduced. Further, an exceptionally uniform and complete regeneration of the catalyst is attained. The use of the invention has the advantage of high uniformity of the product, increased catalyst life and catalytic effectiveness, increased economy of operation and also closer control of operating conditions.

I claim:

1. Apparatus especially adapted to the conversion of hydrocarbons which comprises a vertically elongated chamber, a plurality of vertically spaced outer chambers on opposite sides of the said elongated chamber, the relative position of the respective outer chambers being staggered so that the upper portion of one chamber is substantially opposite the lower portion of the next higher chamber on the opposite side, each outer chamber communicating with the said vertically elongated chamber through louvers, the slats of which extend upwardly into the respective vertically spaced outer chambers, a second vertically elongated chamber coaxially positioned within the first said elongated chamber, substantially co-extensive therewith and in open communication therewith at its upper and lower ends, mechanical conveying means in the second elongated chamber, a plurality of vertically spaced inlet conduits leading to the second vertically elongated chamber and conduits leading to the uppermost and lowermost vertically spaced outer chambers.

2. Apparatus especially adapted to the conversion of hydrocarbons which comprises a vertically elongated chamber, a plurality of vertically spaced outer chambers on opposite sides of the said elongated chamber, the relative position of the respective outer chambers being staggered so that the upper portion of one chamber is substantially opposite the lower portion of the next higher chamber on the opposite side, each outer chamber communicating with the said vertically elongated chamber through louvers, the slats of which extend upwardly into the respective vertically spaced outer chambers, a second vertically elongated chamber coaxially positioned within the first said elongated chamber in heat exchange relation therewith, substantially co-extensive therewith and in open communication therewith at its upper and lower ends, mechanical conveying means in the second elongated chamber, a plurality of vertically spaced inlet conduits leading to the second vertically elongated chamber and conduits leading to the uppermost and lowermost vertically spaced outer chambers.

3. Apparatus especially adapted to the conversion of hydrocarbons which comprises a vertically elongated chamber, a plurality of vertically spaced outer chambers on opposite sides of the said elongated chamber, the relative position of the respective outer chambers being staggered so that the upper portion of one chamber is substantially opposite the lower portion of the next higher chamber on the opposite side, each outer chamber communicating with the said vertically elongated chamber through louvers, the slats of which extend upwardly into the respective vertically spaced outer chambers, a second vertically elongated chamber coaxially positioned within the first said elongated chamber, substantially co-extensive therewith and in open communication therewith at its upper and lower ends, a helical screw conveyor extending through the second vertically elongated chamber, a plurality of vertically spaced inlet conduits leading to the second vertically elongated chamber and conduits leading to the uppermost and lowermost vertically spaced outer chambers.

4. Apparatus especially adapted to the conversion of hydrocarbons which comprises a vertically elongated chamber, a plurality of vertically spaced outer chambers on opposite sides of the said elongated chamber, the relative position of the respective outer chambers being staggered so that the upper portion of one chamber is substantially opposite the lower portion of the next higher chamber on the opposite side, each outer chamber communicating with the said vertically elongated chamber through louvers, the slats of which extend upwardly into the respective vertically spaced outer chambers, a second vertically elongated chamber coaxially positioned within the first said elongated chamber, substantially co-extensive therewith and in open communication therewith at its upper and lower ends, mechanical conveying means in the second elongated chamber, a plurality of vertically spaced inlet conduits leading to the second vertically elongated chamber and conduits leading to the uppermost, the lowermost and to at least one intermediate vertically spaced outer chamber.

LA VERN HERBERT BECKBERGER.

REFERENCES CITED

The following references are of record in the file of this patent:

UNITED STATES PATENTS

| Number | Name | Date |
| --- | --- | --- |
| 1,798,307 | Cooper | Mar. 31, 1931 |
| 2,317,379 | Hemminger | Apr. 27, 1943 |
| 2,378,342 | Voorhees et al. | June 12, 1945 |
| 2,391,434 | McAfee | Dec. 25, 1945 |
| 2,417,393 | Evans | Mar. 11, 1947 |
| 2,425,969 | Utterback | Aug. 19, 1947 |